(12) United States Patent
Mezger et al.

(10) Patent No.: US 10,150,927 B2
(45) Date of Patent: Dec. 11, 2018

(54) POLYMERS AS ADDITIVES FOR FUELS AND LUBRICANTS

(71) Applicant: BASF SE, Ludwigshafen (DE)

(72) Inventors: Jochen Mezger, Lautersheim (DE); Maxim Peretolchin, Lambrecht (DE); Aaron Flores-Figueroa, Mannheim (DE); Markus Hansch, Speyer (DE); Ludwig Voelkel, Limburgerhof (DE); Ivette Garcia Castro, Ludwigshafen (DE); Klaus Muehlbach, Gruenstadt (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 15/115,150

(22) PCT Filed: Jan. 29, 2015

(86) PCT No.: PCT/EP2015/051822
§ 371 (c)(1),
(2) Date: Oct. 17, 2016

(87) PCT Pub. No.: WO2015/114051
PCT Pub. Date: Aug. 6, 2015

(65) Prior Publication Data
US 2017/0037336 A1    Feb. 9, 2017

(30) Foreign Application Priority Data

Jan. 29, 2014 (EP) ..................... 14152991
Dec. 4, 2014 (WO) ................. PCT/EP2014/076622
Dec. 16, 2014 (EP) ..................... 14198266

(51) Int. Cl.
C10L 10/04 (2006.01)
C10M 129/72 (2006.01)
(Continued)

(52) U.S. Cl.
CPC ............ *C10L 10/04* (2013.01); *C08F 210/14* (2013.01); *C08F 222/06* (2013.01); *C10L 1/146* (2013.01);
(Continued)

(58) Field of Classification Search
CPC .......... C10M 145/12; C10M 2209/084; C10M 159/005; C10M 2209/086; C10M 129/34;
(Continued)

(56) References Cited

U.S. PATENT DOCUMENTS 3,382,056 A   5/1968   Mehmedbasich
4,171,959 A   10/1979  Vartanian
(Continued)

FOREIGN PATENT DOCUMENTS

EP   0 061 895 A2   10/1982
EP   0 261 957 A2   3/1988
(Continued)

OTHER PUBLICATIONS

International Search Report dated Mar. 18, 2015 in PCT/EP2015/051822 (with English language translation).
(Continued)

*Primary Examiner* — Taiwo Oladapo
(74) *Attorney, Agent, or Firm* — Oblon, McClelland, Maier & Neustadt, L.L.P.

(57) ABSTRACT

The present invention relates to novel uses of corrosion inhibitors in fuels and lubricants.

19 Claims, 1 Drawing Sheet

(51) Int. Cl.

| | |
|---|---|
| *C10M 129/92* | (2006.01) |
| *C10L 1/188* | (2006.01) |
| *C10M 129/34* | (2006.01) |
| *C10M 145/12* | (2006.01) |
| *C10M 145/16* | (2006.01) |
| *C10M 159/00* | (2006.01) |
| *C10M 171/00* | (2006.01) |
| *C10L 1/14* | (2006.01) |
| *C10L 1/16* | (2006.01) |
| *C10L 1/196* | (2006.01) |
| *C10L 10/18* | (2006.01) |
| *C10L 10/06* | (2006.01) |
| *C08F 210/14* | (2006.01) |
| *C08F 222/06* | (2006.01) |
| *C10L 1/197* | (2006.01) |
| *C10L 1/236* | (2006.01) |

(52) U.S. Cl.
CPC .............. *C10L 1/1641* (2013.01); *C10L 1/188* (2013.01); *C10L 1/1883* (2013.01); *C10L 1/1963* (2013.01); *C10L 1/1966* (2013.01); *C10L 1/1973* (2013.01); *C10L 1/1976* (2013.01); *C10L 10/06* (2013.01); *C10L 10/18* (2013.01); *C10M 129/34* (2013.01); *C10M 129/72* (2013.01); *C10M 129/92* (2013.01); *C10M 145/12* (2013.01); *C10M 145/16* (2013.01); *C10M 159/005* (2013.01); *C10M 171/00* (2013.01); *C10L 1/2362* (2013.01); *C10L 1/2364* (2013.01); *C10L 1/2366* (2013.01); *C10L 1/2368* (2013.01); *C10L 2230/22* (2013.01); *C10L 2270/023* (2013.01); *C10L 2270/026* (2013.01); *C10M 2205/028* (2013.01); *C10M 2207/123* (2013.01); *C10M 2209/084* (2013.01); *C10M 2209/086* (2013.01); *C10M 2217/022* (2013.01); *C10M 2217/024* (2013.01); *C10M 2217/026* (2013.01); *C10M 2217/028* (2013.01); *C10N 2230/04* (2013.01); *C10N 2230/12* (2013.01); *C10N 2230/54* (2013.01); *C10N 2240/103* (2013.01); *C10N 2240/104* (2013.01); *C10N 2260/00* (2013.01)

(58) Field of Classification Search
CPC .............. C10M 129/72; C10M 129/92; C10M 145/16; C10M 159/00; C10M 2207/123; C10L 10/06; C10L 1/1966; C10L 10/04; C10L 10/18; C10L 2270/026; C10L 2230/22; C10L 1/188; C10L 1/1883; C10N 2260/00; C10N 2230/12; C10N 2240/104; C10N 2240/103; C10N 2230/04

See application file for complete search history.

(56) References Cited

U.S. PATENT DOCUMENTS

| | | | |
|---|---|---|---|
| 4,248,719 A | 2/1981 | Chafetz et al. | |
| 4,491,455 A | 1/1985 | Ishizaki et al. | |
| 4,877,416 A | 10/1989 | Campbell | |
| 4,959,077 A | 9/1990 | Martischius et al. | |
| 5,080,686 A * | 1/1992 | Garrecht | C10L 1/1883 44/351 |
| 5,358,651 A * | 10/1994 | Walsh | C07D 207/412 44/347 |
| 6,743,266 B2 | 6/2004 | Derosa et al. | |
| 2005/0126070 A1* | 6/2005 | Krull | C10L 1/143 44/393 |
| 2013/0133243 A1* | 5/2013 | Roger-Gopfert | C10L 1/221 44/330 |
| 2013/0227878 A1 | 9/2013 | Wolf et al. | |

FOREIGN PATENT DOCUMENTS

| | | |
|---|---|---|
| EP | 0 299 120 A1 | 1/1989 |
| EP | 0 307 815 A1 | 3/1989 |
| EP | 0 452 328 | 10/1991 |
| EP | 2 033 945 A1 | 3/2009 |
| GB | 2496514 A | 5/2013 |
| WO | WO 87/01126 A1 | 2/1987 |
| WO | WO 93/18115 A1 | 9/1993 |
| WO | WO 94/24231 A1 | 10/1994 |
| WO | WO 96/03367 A1 | 2/1996 |
| WO | WO 96/03479 A1 | 2/1996 |
| WO | WO 97/03946 A1 | 2/1997 |
| WO | WO 98/04656 A1 | 2/1998 |
| WO | WO 99/29748 A1 | 6/1999 |
| WO | WO 00/44857 A2 | 8/2000 |
| WO | WO 00/47698 A1 | 8/2000 |
| WO | WO 2004/035715 A1 | 4/2004 |
| WO | WO 2005/054314 A2 | 6/2005 |
| WO | WO 2006/135881 A2 | 12/2006 |
| WO | WO 2008/060888 A2 | 5/2008 |
| WO | WO 2010/132259 A1 | 11/2010 |
| WO | WO 2011/095819 A1 | 8/2011 |
| WO | WO 2011/110860 A1 | 9/2011 |
| WO | WO 2011/146289 A1 | 11/2011 |
| WO | WO 2011/161149 A1 | 12/2011 |
| WO | WO 2012/004300 A1 | 1/2012 |
| WO | WO 2013/070503 A1 | 5/2013 |
| WO | WO 2013/101256 A2 | 7/2013 |
| WO | WO 2014/195464 A1 | 12/2014 |

OTHER PUBLICATIONS

International Preliminary Report on Patentability dated Apr. 19, 2016 in PCT/EP2015/051822 (with English language translation).
B. Müller, et al., "Polymeric Corrosion Inhibitors for Copper and Brass Pigments" Journal of Applied Polymer Science, vol. 80, No. 3, XP055174158, 2001, pp. 475-483.

* cited by examiner

| step | duration (minutes) | engine speed (rpm) +/- 20 | load (%) | torque (Nm) +/- 5 | boost air after IC (°C) +/- 3 |
|---|---|---|---|---|---|
| 1 | 2' | 1750 | (20) | 62 | 45 |
| 2 | 7' | 3000 | (60) | 173 | 50 |
| 3 | 2' | 1750 | (20) | 62 | 45 |
| 4 | 7' | 3500 | (80) | 212 | 50 |
| 5 | 2' | 1750 | (20) | 62 | 45 |
| 6 | 10' | 4000 | 100 | * | 50 |
| 7 | 2' | 1250 | (10) | 25 | 43** |
| 8 | 7' | 3000 | 100 | * | 50 |
| 9 | 2' | 1250 | (10) | 25 | 43** |
| 10 | 10' | 2000 | 100 | * | 50 |
| 11 | 2' | 1250 | (10) | 25 | 43** |
| 12 | 7' | 4000 | 100 | * | 50 |
| | Σ= 1 hour | | | | |
\* for expected range see appendix 06.5
\*\* target only
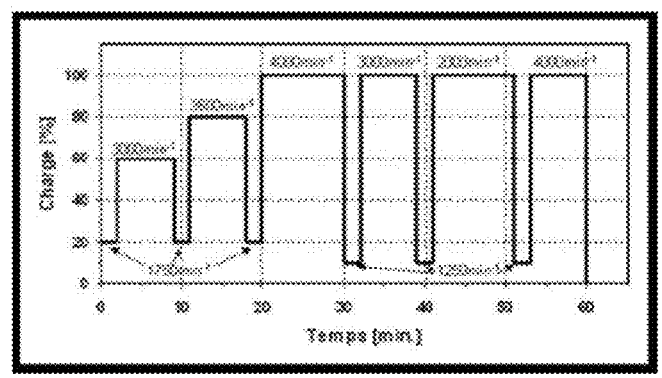

POLYMERS AS ADDITIVES FOR FUELS AND LUBRICANTS

CROSS-REFERENCE TO RELATED APPLICATIONS

This application is a National Stage of PCT/EP2015/051822, which was filed on Jan. 29, 2015. This application is based upon and claims the benefit of priority to European Application No. 14152991.7, which was filed on Jan. 29, 2014, and to PCT/EP2014/076622, which was filed on Dec. 4, 2014, and to European Application No. 14198266.0, which was filed on Dec 16, 2014.

The present invention relates to the use of particular polymers as fuel additive or lubricant additive; to processes for preparation of such additives, and fuels and lubricants additized therewith, such as, more particularly, as a detergent additive; to use of these polymers for reducing the level of or preventing deposits in the fuel systems and especially the injection systems of direct injection diesel engines, especially in common rail injection systems, for reducing the fuel consumption of direct injection diesel engines, especially of diesel engines with common rail injection systems, and for minimizing power loss in direct injection diesel engines, especially in diesel engines with common rail injection systems; and as an additive for gasoline fuels, especially for operation of DISI engines.

BACKGROUND OF THE INVENTION

In direct injection diesel engines, the fuel is injected and distributed ultrafinely (nebulized) by a multihole injection nozzle which reaches directly into the combustion chamber of the engine, instead of being introduced into a prechamber or swirl chamber as in the case of the conventional (chamber) diesel engine. The advantage of direct injection diesel engines lies in their high performance for diesel engines and nevertheless low fuel consumption. Moreover, these engines achieve a very high torque even at low speeds.

At present, essentially three methods are being used for injection of the fuel directly into the combustion chamber of the diesel engine: the conventional distributor injection pump, the pump-nozzle system (unit-injector system or unit-pump system), and the common rail system.

In the common rail system, the diesel fuel is conveyed by a pump with pressures up to 2000 bar into a high-pressure line, the common rail. Proceeding from the common rail, branch lines run to the different injectors which inject the fuel directly into the combustion chamber. The full pressure is always applied to the common rail, which enables multiple injection or a specific injection form. In the other injection systems, in contrast, only a smaller variation in the injection is possible. Injection in the common rail is divided essentially into three groups: (1.) pre-injection, by which essentially softer combustion is achieved, such that harsh combustion noises ("nailing") are reduced and the engine seems to run quietly; (2.) main injection, which is responsible especially for a good torque profile; and (3.) post-injection, which especially ensures a low $NO_x$ value. In this post-injection, the fuel is generally not combusted, but instead vaporized by residual heat in the cylinder. The exhaust gas/fuel mixture formed is transported to the exhaust gas system, where the fuel, in the presence of suitable catalysts, acts as a reducing agent for the nitrogen oxides $NO_x$.

The variable, cylinder-individual injection in the common rail injection system can positively influence the pollutant emission of the engine, for example the emission of nitrogen oxides ($NO_x$), carbon monoxide (CO) and especially of particulates (soot). This makes it possible, for example, for engines equipped with common rail injection systems to meet the Euro 4 standard theoretically even without additional particulate filters.

In modern common rail diesel engines, under particular conditions, for example when biodiesel-containing fuels or fuels with metal impurities such as zinc compounds, copper compounds, lead compounds and other metal compounds are used, deposits can form on the injector orifices, which adversely affect the injection performance of the fuel and hence impair the performance of the engine, i.e. especially reduce the power, but in some cases also worsen the combustion. The formation of deposits is enhanced further by further developments in the injector construction, especially by the change in the geometry of the nozzles (narrower, conical orifices with rounded outlet). For lasting optimal functioning of engine and injectors, such deposits in the nozzle orifices must be prevented or reduced by suitable fuel additives.

In the injection systems of modern diesel engines, deposits cause significant performance problems. It is common knowledge that such deposits in the spray channels can lead to a decrease in the fuel flow and hence to power loss. Deposits at the injector tip, in contrast, impair the optimal formation of fuel spray mist and, as a result, cause worsened combustion and associated higher emissions and increased fuel consumption. In contrast to these conventional "external" deposition phenomena, "internal" deposits (referred to collectively as internal diesel injector deposits (IDIDs)) in particular parts of the injectors, such as at the nozzle needle, at the control piston, at the valve piston, at the valve seat, in the control unit and in the guides of these components, also increasingly cause performance problems. Conventional additives exhibit inadequate action against these IDIDs.

The "injection system" is understood to mean the part of the fuel system in motor vehicles from the fuel pump up to and including the injector outlet. "Fuel system" is understood to mean the components of motor vehicles that are in contact with the particular fuel, preferably the region from the tank up to and including the injector outlet.

In one embodiment of the present invention, the inventive compounds counteract deposits not just in the injection system but also in the rest of the fuel system, here especially deposits in fuel filters and pumps.

U.S. Pat. No. 4,248,719 describes quaternized ammonium salts which are prepared by reacting an alkenylsuccinimide with a monocarboxylic ester and find use as dispersants in lubricant oils for prevention of sludge formation. More particularly, for example, the reaction of polyisobutylsuccinic anhydride (PIBSA) with N,N-dimethylaminopropylamine (DMAPA) and quaternization with methyl salicylate is described. However, use in fuels, more particularly diesel fuels, is not proposed therein. The use of PIBSA with low bismaleation levels of <20% is not described therein.

U.S. Pat. No. 4,171,959 describes quaternized ammonium salts of hydrocarbyl-substituted succinimides, which are suitable as detergent additives for gasoline fuel compositions. Quaternization is preferably accomplished using alkyl halides. Also mentioned are organic $C_2$-$C_8$-hydrocarbyl carboxylates and sulfonates. Consequently, the quaternized ammonium salts provided according to the teaching therein have, as a counterion, either a halide or a $C_2$-$C_8$-hydrocarbyl carboxylate or a $C_2$-$C_8$-hydrocarbyl sulfonate group. The use of PIBSA with low bismaleation levels of <20% is likewise not described therein.

EP-A-2 033 945 discloses cold flow improvers which are prepared by quaternizing specific tertiary monoamines bearing at least one $C_8$-$C_{40}$-alkyl radical with a $C_1$-$C_4$-alkyl ester of specific carboxylic acids. Examples of such carboxylic esters are dimethyl oxalate, dimethyl maleate, dimethyl phthalate and dimethyl fumarate. Uses other than that for improvement of the CFPP value of middle distillates are not demonstrated in EP-A-2 033 945.

WO 2006/135881 describes quaternized ammonium salts prepared by condensation of a hydrocarbyl-substituted acylating agent and of an oxygen or nitrogen atom-containing compound with a tertiary amino group, and subsequent quaternization by means of hydrocarbyl epoxide in the presence of stoichiometric amounts of an acid such as, more particularly, acetic acid. Further quaternizing agents claimed in WO 2006/135881 are dialkyl sulfates, benzyl halides and hydrocarbyl-substituted carbonates, and dimethyl sulfate, benzyl chloride and dimethyl carbonate have been studied experimentally.

WO 2011/146289 describes nitrogen-free additives formed from a substituted hydrocarbon having at least two carboxyl groups in free form or in anhydride form for improving detergency in fuel systems. Examples disclosed include hydrocarbyl-substituted succinic anhydrides and hydrolyzed forms thereof.

It is an object of the present invention to provide a novel class of polymer-based additives for use in modern diesel fuels and gasoline fuels.

SUMMARY OF THE INVENTION

The above object is surprisingly achieved by polymers having a statistical average of
- at least 4 acid groups per polymer chain,
- a ratio of carbon atoms per acid group of 7 to 35 and
- an acid number of 80 to 320 mg KOH/g, determined by potentiographic titration with 0.5 molar aqueous hydrochloric acid after heating in 0.5 molar ethanolic potassium hydroxide solution for three hours.

The polymers according to the present invention may be homopolymers or copolymers, preferably copolymers.

The polymers may be obtained by any desired methods, preferably by polyaddition or polycondensation, preferably by polyaddition. The polyaddition can preferably be effected by free-radical or ionic means, preferably free-radical means.

These polymers have the particular feature that they act against a wide variety of different deposits which impair the performance of modern diesel engines. The inventive compounds act, for example, against power loss both caused by introduction of zinc and caused by introduction of sodium into the diesel fuel. In doing so, deposits in the spray channels and the injector tip are essentially eliminated or avoided. Secondly, the inventive compounds also counteract internal diesel injector deposits (IDIDs) caused by Na, Ca and/or K ions (called Na, Ca and K soap IDIDs respectively) and/or polymeric deposits. Na, Ca and K soap IDIDs are deposits comprising the metal ions in question with any desired counterions. The polymeric deposits, in contrast, are free of metal ions and are attributable to organic material of high molecular weight having zero or sparing solubility in the fuel.

DESCRIPTION OF FIGURES

FIG. 1 shows the running of a one-hour engine test cycle according to CEC F-098-08.

DETAILED DESCRIPTION OF THE INVENTION

A1) Specific Embodiments

Specific embodiments of the invention are:
1. The use of polymers having a statistical average of
   - at least 4 acid groups per polymer chain,
   - a ratio of carbon atoms per acid group of 7 to 35 and
   - an acid number of 80 to 320 mg KOH/g, determined by potentiographic titration with 0.5 molar aqueous hydrochloric acid after heating in 0.5 molar ethanolic potassium hydroxide solution for three hours.
   as a fuel additive or lubricant additive, especially diesel fuel additive.
2. The use according to embodiment 1 as an additive for reducing the fuel consumption of direct injection diesel engines, especially of diesel engines with common rail injection systems.
3. The use according to either of the embodiments as an additive for minimizing power loss in direct injection diesel engines, especially in diesel engines with common rail injection systems.
4. The use according to any of the embodiments as an additive for minimizing power loss caused by K, Zn, Ca and/or Na ions (called K, Zn, Ca and Na power loss respectively).
5. The use according to any of the embodiments as a gasoline fuel additive for reducing the level of deposits in the intake system of a gasoline engine, such as, more particularly, DISI and PFI (port fuel injector) engines.
6. The use according to any of the embodiments as a diesel fuel additive for reducing and/or preventing deposits in the fuel systems, especially injection systems, such as, more particularly, the internal diesel injector deposits (IDIDs), and/or valve sticking in direct injection diesel engines, especially in common rail injection systems.
7. The use according to any of the embodiments as a diesel fuel additive for reducing and/or preventing the internal diesel injector deposits (IDIDs) caused by Na, Ca and/or K ions (called Na, Ca and K soap IDIDs respectively).
8. The use according to any of the embodiments as a diesel fuel additive for reducing and/or preventing the internal diesel injector deposits (IDIDs) caused by polymeric deposits.
9. The use according to any of the preceding embodiments, wherein the fuel is selected from diesel fuels, biodiesel fuels, gasoline fuels, and alkanol-containing gasoline fuels.
10. An additive concentrate comprising, in combination with further diesel or gasoline fuel additives or lubricant additives, at least one polymer having a statistical average of
    - at least 4 acid groups per polymer chain,
    - a ratio of carbon atoms per acid group of 7 to 35 and
    - an acid number of 80 to 320 mg KOH/g, determined by potentiographic titration with 0.5 molar aqueous hydrochloric acid after heating in 0.5 molar ethanolic potassium hydroxide solution for three hours.
11. A fuel composition, lubricant composition or kerosene composition, especially diesel fuel composition, comprising a polymer having a statistical average of
    - at least 4 acid groups per polymer chain,
    - a ratio of carbon atoms per acid group of 7 to 35 and
    - an acid number of 80 to 320 mg KOH/g, determined by potentiographic titration with 0.5 molar aqueous hydrochloric acid after heating in 0.5 molar ethanolic potassium hydroxide solution for three hours.

Description of the Polymer

The polymers for the use of the invention are regular, random or block polymers having a statistical average of
at least 4 acid groups per polymer chain,
a ratio of carbon atoms per acid group of 7 to 35 and
an acid number of 80 to 320 mg KOH/g, determined by potentiographic titration with 0.5 molar aqueous hydrochloric acid after heating in 0.5 molar ethanolic potassium hydroxide solution for three hours.

Polymers of this kind have been found to be effective in suppressing and/or eliminating deposits in engines.

Preferably, the polymers of the invention have a solubility in toluene at 20° C. of at least 5 g/100 mL, more preferably of at least 7.5 g/100 mL and most preferably of at least 10 g/100 mL.

In the case of homopolymers, the polymers have more than four, preferably more than five, more preferably more than eight and most preferably more than ten repeat units of the parent monomers, and in the case of copolymers more than two repeat units of each parent monomer, preferably more than three, more preferably more than four and most preferably more than five.

The acid groups are, for example, carboxyl groups, sulfonic acid groups or phosphonic acid groups, preferably carboxyl groups.

The number of acid groups per polymer chain is, on statistical average, preferably at least 5, more preferably at least 6, even more preferably at least 7 and especially at least 8 acid groups per polymer chain.

The upper limit in the number of acid groups per polymer chain is, on statistical average, preferably 50, more preferably 40, even more preferably 30 and especially 26 acid groups per polymer chain.

The polymer may, as well as hydrocarbon units and acid groups, have further functional groups, for example oxygen-containing functional groups, preferably carbonate groups, ether groups or ester groups, or nitrogen-containing functional groups, preferably urea groups, urethane groups, amino groups or amide groups.

Oxygen-containing functional groups refer here to those functional groups comprising no other heteroatoms than oxygen atoms.

Nitrogen-containing functional groups refer here to those functional groups comprising no other heteroatoms than nitrogen atoms and optionally oxygen atoms.

Preferably, the polymers comprise not more than 5, more preferably not more than 4, even more preferably not more than 3, particularly not more than 2 and especially not more than one functional group other than oxygen-containing functional groups and nitrogen-containing functional groups per polymer chain.

Preferably, the polymers comprise not more than 5, more preferably not more than 4, even more preferably not more than 3, particularly not more than 2 and especially not more than one nitrogen-containing functional group per polymer chain other than amino groups, urea groups, urethane groups or amide groups.

In a particularly preferred embodiment, the polymers comprise not more than 2 amino groups, even more preferably not more than 1 amino group and especially zero amino groups per polymer chain.

In a further particularly preferred embodiment, the polymers comprise not more than 10, even more preferably not more than 8, particularly not more than 6 and especially not more than four urea, urethane or amide groups per polymer chain.

Preferably, the polymers comprise not more than 4, more preferably not more than 3, even more preferably not more than 2, particularly not more than 1 and especially no oxygen-containing functional group per polymer chain other than carbonate groups, ether groups or ester groups.

The number of carbonate, ether and/or ester groups per polymer chain, particularly of ester groups per polymer chain, is less relevant in accordance with the invention, provided that there is simultaneous compliance with the required ratio of carbon atoms per acid group.

In a preferred embodiment, the polymers comprise not more than 20, more preferably not more than 15, especially preferably not more than 10 and particularly not more than 5 ether groups per polymer chain.

In a further preferred embodiment, the polymers comprise not more than 50, more preferably not more than 40, especially preferably not more than 30 and particularly not more than 26 carbonate or ester groups per polymer chain.

In a further, likewise preferred embodiment, the polymers comprise not more than 4, more preferably not more than 3, especially preferably not more than 2, particularly not more than 1 and especially zero ester groups per polymer chain.

The ratio of carbon atoms in the polymer per acid group is defined as the total number of carbon atoms per polymer chain divided by the acid groups per polymer chain on statistical average. Both parameters can be determined from the monomers used and the molecular weight ascertained by gel permeation chromatography (with tetrahydrofuran and polystyrene as standard), and from the monomers used in the polymerization.

The lower limit in the ratio of carbon atoms in the polymer per acid group is preferably at least 8, more preferably at least 9, even more preferably at least 10, particularly at least 11 and especially at least 12.

The upper limit in the ratio of carbon atoms in the polymer per acid group is preferably up to 33, more preferably up to 31, even more preferably up to 29, particularly up to 27 and especially up to 25.

The stated ratio of carbon atoms in the polymer per acid group firstly brings about good solubility in fuels.

The polymers additionally have an acid number of 80 to 320, preferably of 90 to 300 and more preferably of 95 to 290 mg KOH/g, determined by potentiographic titration with 0.5 molar aqueous hydrochloric acid after heating in 0.5 molar ethanolic potassium hydroxide solution for three hours.

Preferably, the polymers additionally have a solubility in toluene at 20° C. of preferably at least 5 g/100 mL, more preferably of at least 7.5 g/100 mL and most preferably of at least 10 g/100 mL.

The polymer generally has a weight-average molecular weight Mw of 0.5 to 20 kDa, preferably 0.6 to 15, more preferably 0.7 to 7, even more preferably 1 to 7 and especially 1.5 to 5 kDa (determined by gel permeation chromatography with tetrahydrofuran and polystyrene as standard).

The number-average molecular weight Mn is usually from 0.5 to 10 kDa, preferably 0.6 to 5, more preferably 0.7 to 4, even more preferably 0.8 to 3 and especially 1 to 2 kDa (determined by gel permeation chromatography with tetrahydrofuran and polystyrene as standard).

In a preferred embodiment, the polymers comprise a high proportion of adjacent carboxylic acid groups, which is determined by a measurement of adjacency. For this purpose, a sample of the polymer is heat-treated between two Teflon films at a temperature of 290° C. for a period of 30 minutes and an FTIR spectrum is recorded at a bubble-free site. The IR spectrum of Teflon is subtracted from the spectra obtained, the layer thickness is determined and the content of cyclic anhydride is determined.

In a preferred embodiment, the adjacency is at least 10%, preferably at least 15%, more preferably at least 20%, even more preferably at least 25% and especially at least 30%.

Use

The fuel additized with the inventive polymer is a gasoline fuel or more particularly a middle distillate fuel, in particular a diesel fuel.

The fuel may comprise further customary additives to improve efficacy and/or suppress wear.

Frequently, the polymers described are used in the form of fuel additive mixtures, together with customary additives:

In the case of diesel fuels, these are primarily customary detergent additives, carrier oils, cold flow improvers, lubricity improvers, corrosion inhibitors other than the polymers described, demulsifiers, dehazers, antifoams, cetane number improvers, combustion improvers, antioxidants or stabilizers, antistats, metallocenes, metal deactivators, dyes and/or solvents.

Accordingly, the invention further provides for the use of polymers having a statistical average of
- at least 4 acid groups per polymer chain,
- a ratio of carbon atoms per acid group of 7 to 35 and
- an acid number of 80 to 320 mg KOH/g, determined by potentiographic titration with 0.5 molar aqueous hydrochloric acid after heating in 0.5 molar ethanolic potassium hydroxide solution for three hours, in additive packages comprising at least one additive selected from the group consisting of detergent additives, carrier oils, cold flow improvers, lubricity improvers, corrosion inhibitors other than the polymers described, demulsifiers, dehazers, antifoams, cetane number improvers, combustion improvers, antioxidants, stabilizers, antistats, metallocenes, metal deactivators, dyes and solvents, for reducing the fuel consumption of direct injection diesel engines, especially of diesel engines with common rail injection systems, and/or for minimizing power loss in direct injection diesel engines, especially in diesel engines with common rail injection systems.

In the case of gasoline fuels, these are in particular lubricity improvers (friction modifiers), corrosion inhibitors other than the polymers described, demulsifiers, dehazers, antifoams, combustion improvers, antioxidants or stabilizers, antistats, metallocenes, metal deactivators, dyes and/or solvents.

Accordingly, the invention further provides for the use of polymers having a statistical average of
- at least 4 acid groups per polymer chain,
- a ratio of carbon atoms per acid group of 7 to 35 and
- an acid number of 80 to 320 mg KOH/g, determined by potentiographic titration with 0.5 molar aqueous hydrochloric acid after heating in 0.5 molar ethanolic potassium hydroxide solution for three hours, in additive packages comprising at least one additive selected from the group consisting of lubricity improvers (friction modifiers), corrosion inhibitors other than the polymers described, demulsifiers, dehazers, antifoams, combustion improvers, antioxidants, stabilizers, antistats, metallocenes, metal deactivators, dyes and solvents, for reducing the level of deposits in the intake system of a gasoline engine, such as, more particularly, DISI and PFI (port fuel injector) engines.

Typical examples of suitable coadditives are listed in the following section:

B1) Detergent Additives

The customary detergent additives are preferably amphiphilic substances which possess at least one hydrophobic hydrocarbon radical with a number-average molecular weight ($M_n$) of 85 to 20 000 and at least one polar moiety selected from:
(Da) mono- or polyamino groups having up to 6 nitrogen atoms, at least one nitrogen atom having basic properties;
(Db) nitro groups, optionally in combination with hydroxyl groups;
(Dc) hydroxyl groups in combination with mono- or polyamino groups, at least one nitrogen atom having basic properties;
(Dd) carboxyl groups or the alkali metal or alkaline earth metal salts thereof;
(De) sulfonic acid groups or the alkali metal or alkaline earth metal salts thereof;
(Df) polyoxy-$C_2$- to $C_4$-alkylene moieties terminated by hydroxyl groups, mono- or polyamino groups, at least one nitrogen atom having basic properties, or by carbamate groups;
(Dg) carboxylic ester groups;
(Dh) moieties derived from succinic anhydride and having hydroxyl and/or amino and/or amido and/or imido groups; and/or
(Di) moieties obtained by Mannich reaction of substituted phenols with aldehydes and mono- or polyamines.

The hydrophobic hydrocarbon radical in the above detergent additives, which ensures the adequate solubility in the fuel, has a number-average molecular weight ($M_n$) of 85 to 20 000, preferably of 113 to 10 000, more preferably of 300 to 5000, even more preferably of 300 to 3000, even more especially preferably of 500 to 2500 and especially of 700 to 2500, in particular of 800 to 1500. As typical hydrophobic hydrocarbon radicals, especially in conjunction with the polar, especially polypropenyl, polybutenyl and polyisobutenyl radicals with a number-average molecular weight $M_n$ of preferably in each case 300 to 5000, more preferably 300 to 3000, even more preferably 500 to 2500, even more especially preferably 700 to 2500 and especially 800 to 1500 into consideration.

Examples of the above groups of detergent additives include the following:

Additives comprising mono- or polyamino groups (Da) are preferably polyalkenemono- or polyalkenepolyamines based on polypropene or on high-reactivity (i.e. having predominantly terminal double bonds) or conventional (i.e. having predominantly internal double bonds) polybutene or polyisobutene with $M_n$=300 to 5000, more preferably 500 to 2500 and especially 700 to 2500. Such additives based on high-reactivity polyisobutene, which can be prepared from the polyisobutene which may comprise up to 20% by weight of n-butene units by hydroformylation and reductive amination with ammonia, monoamines or polyamines such as dimethylaminopropylamine, ethylenediamine, diethylenetriamine, triethylenetetramine or tetraethylenepentamine, are known especially from EP-A 244 616. When polybutene or polyisobutene having predominantly internal double bonds (usually in the β and γ positions) are used as starting materials in the preparation of the additives, a possible preparative route is by chlorination and subsequent amination or by oxidation of the double bond with air or ozone to give the carbonyl or carboxyl compound and subsequent amination under reductive (hydrogenating) conditions. The amines used here for the amination may be, for example, ammonia, monoamines or the abovementioned polyamines. Corresponding additives based on polypropene are described more particularly in WO-A 94/24231.

Further particular additives comprising monoamino groups (Da) are the hydrogenation products of the reaction products of polyisobutenes having an average degree of polymerization P=5 to 100 with nitrogen oxides or mixtures of nitrogen oxides and oxygen, as described more particularly in WO-A 97/03946.

Further particular additives comprising monoamino groups (Da) are the compounds obtainable from polyisobutene epoxides by reaction with amines and subsequent dehydration and reduction of the amino alcohols, as described more particularly in DE-A 196 20 262.

Additives comprising nitro groups (Db), optionally in combination with hydroxyl groups, are preferably reaction products of polyisobutenes having an average degree of polymerization P=5 to 100 or 10 to 100 with nitrogen oxides or mixtures of nitrogen oxides and oxygen, as described more particularly in WO-A 96/03367 and in WO-A 96/03479. These reaction products are generally mixtures of pure nitropolyisobutenes (e.g. α,β-dinitropolyisobutene) and mixed hydroxynitropolyisobutenes (e.g. α-nitro-β-hydroxypolyisobutene).

Additives comprising hydroxyl groups in combination with mono- or polyamino groups (Dc) are especially reaction products of polyisobutene epoxides obtainable from polyisobutene having preferably predominantly terminal double bonds and $M_n$=300 to 5000, with ammonia or mono- or polyamines, as described more particularly in EP-A 476 485.

Additives comprising carboxyl groups or their alkali metal or alkaline earth metal salts (Dd) are preferably copolymers of $C_2$- to $C_{40}$-olefins with maleic anhydride which have a total molar mass of 500 to 20 000 and wherein some or all of the carboxyl groups have been converted to the alkali metal or alkaline earth metal salts and any remainder of the carboxyl groups has been reacted with alcohols or amines. Such additives are disclosed more particularly by EP-A 307 815. Such additives serve mainly to prevent valve seat wear and can, as described in WO-A 87/01126, advantageously be used in combination with customary fuel detergents such as poly(iso)buteneamines or polyetheramines.

Additives comprising sulfonic acid groups or their alkali metal or alkaline earth metal salts (De) are preferably alkali metal or alkaline earth metal salts of an alkyl sulfosuccinate, as described more particularly in EP-A 639 632. Such additives serve mainly to prevent valve seat wear and can be used advantageously in combination with customary fuel detergents such as poly(iso)buteneamines or polyetheramines.

Additives comprising polyoxy-$C_2$-$C_4$-alkylene moieties (Df) are preferably polyethers or polyetheramines which are obtainable by reaction of $C_2$- to $C_{60}$-alkanols, $C_6$- to $C_{30}$-alkanediols, mono- or di-$C_2$- to $C_{30}$-alkylamines, $C_1$- to $C_{30}$-alkylcyclohexanols or $C_1$- to $C_{30}$-alkylphenols with 1 to 30 mol of ethylene oxide and/or propylene oxide and/or butylene oxide per hydroxyl group or amino group and, in the case of the polyetheramines, by subsequent reductive amination with ammonia, monoamines or polyamines. Such products are described more particularly in EP-A 310 875, EP-A 356 725, EP-A 700 985 and U.S. Pat. No. 4,877,416. In the case of polyethers, such products also have carrier oil properties. Typical examples thereof are tridecanol butoxylates or isotridecanol butoxylates, isononylphenol butoxylates and also polyisobutenol butoxylates and propoxylates, and also the corresponding reaction products with ammonia.

Additives comprising carboxylic ester groups (Dg) are preferably esters of mono-, di- or tricarboxylic acids with long-chain alkanols or polyols, especially those having a minimum viscosity of 2 $mm^2/s$ at 100° C., as described more particularly in DE-A 38 38 918. The mono-, di- or tricarboxylic acids used may be aliphatic or aromatic acids, and particularly suitable ester alcohols or ester polyols are long-chain representatives having, for example, 6 to 24 carbon atoms. Typical representatives of the esters are adipates, phthalates, isophthalates, terephthalates and trimellitates of isooctanol, of isononanol, of isodecanol and of isotridecanol. Such products also satisfy carrier oil properties.

Additives comprising moieties derived from succinic anhydride and having hydroxyl and/or amino and/or amido and/or especially imido groups (Dh) are preferably corresponding derivatives of alkyl- or alkenyl-substituted succinic anhydride and especially the corresponding derivatives of polyisobutenylsuccinic anhydride which are obtainable by reacting conventional or high-reactivity polyisobutene having $M_n$=preferably 300 to 5000, more preferably 300 to 3000, even more preferably 500 to 2500, even more especially preferably 700 to 2500 and especially 800 to 1500, with maleic anhydride by a thermal route in an ene reaction or via the chlorinated polyisobutene. The moieties having hydroxyl and/or amino and/or amido and/or imido groups are, for example, carboxylic acid groups, acid amides of monoamines, acid amides of di- or polyamines which, in addition to the amide function, also have free amine groups, succinic acid derivatives having an acid and an amide function, carboximides with monoamines, carboximides with di- or polyamines which, in addition to the imide function, also have free amine groups, or diimides which are formed by the reaction of di- or polyamines with two succinic acid derivatives. Such fuel additives are common knowledge and are described, for example, in documents (1) and (2). They are preferably the reaction products of alkyl- or alkenyl-substituted succinic acids or derivatives thereof with amines and more preferably the reaction products of polyisobutenyl-substituted succinic acids or derivatives thereof with amines. Of particular interest in this context are reaction products with aliphatic polyamines (polyalkyleneimines) such as, more particularly, ethylenediamine, diethylenetriamine, triethylenetetramine, tetraethylenepentamine, pentaethylenehexamine and hexaethyleneheptamine, which have an imide structure.

In a preferred embodiment, the inventive compounds may be combined with quaternized compounds as described in WO 2012/004300, preferably at page 5 line 18 to page 33 line 5 thereof, more preferably preparation example 1, which is hereby explicitly incorporated into the present disclosure by way of reference.

In a further preferred embodiment, the inventive compounds may be combined with quaternized compounds as described in unpublished International Application PCT/EP2014/061834, filed Jun. 6, 2014, preferably at page 5 line 21 to page 47 line 34 thereof, more preferably preparation examples 1 to 17.

In a further preferred embodiment, the inventive compounds may be combined with quaternized compounds as described in WO 11/95819 A1, preferably at page 4 line 5 to page 13 line 26 thereof, more preferably preparation example 2.

In a further preferred embodiment, the inventive compounds may be combined with quaternized compounds as described in WO 11/110860 A1, preferably at page 4 line 7 to page 16 line 26 thereof, more preferably preparation examples 8, 9, 11 and 13.

In a further preferred embodiment, the inventive compounds may be combined with quaternized compounds as described in WO 06/135881 A2, preferably at page 5 line 14 to page 12 line 14 thereof, more preferably examples 1 to 4.

In a further preferred embodiment, the inventive compounds may be combined with quaternized compounds as described in WO 10/132259 A1, preferably at page 3 line 29 to page 10 line 21 thereof, more preferably example 3.

In a further preferred embodiment, the inventive compounds may be combined with quaternized compounds as described in WO 08/060888 A2, preferably at page 6 line 15 to page 14 line 29 thereof, more preferably examples 1 to 4.

In a further preferred embodiment, the inventive compounds may be combined with quaternized compounds as described in GB 2496514 A, preferably at paragraphs [00012] to [00039] thereof, more preferably examples 1 to 3.

In a further preferred embodiment, the inventive compounds may be combined with quaternized compounds as described in WO 2013 070503 A1, preferably at paragraphs [00011] to [00039] thereof, more preferably examples 1 to 5.

Additives comprising moieties (Di) obtained by Mannich reaction of substituted phenols with aldehydes and mono- or polyamines are preferably reaction products of polyisobutene-substituted phenols with formaldehyde and mono- or polyamines such as ethylenediamine, diethylenetriamine, triethylenetetramine, tetraethylenepentamine or dimethylaminopropylamine. The polyisobutenyl-substituted phenols may originate from conventional or high-reactivity polyisobutene having $M_n$=300 to 5000. Such "polyisobutene Mannich bases" are described more particularly in EP-A 831 141.

One or more of the detergent additives mentioned can be added to the fuel in such an amount that the dosage rate of these detergent additives is preferably 25 to 2500 ppm by weight, especially 75 to 1500 ppm by weight, in particular 150 to 1000 ppm by weight.

B2) Carrier Oils

Carrier oils additionally used may be of mineral or synthetic nature. Suitable mineral carrier oils are fractions obtained in crude oil processing, such as brightstock or base oils having viscosities, for example, from the SN 500-2000 class; but also aromatic hydrocarbons, paraffinic hydrocarbons and alkoxyalkanols. Likewise useful is a fraction which is obtained in the refining of mineral oil and is known as "hydrocrack oil" (vacuum distillate cut having a boiling range of from about 360 to 500° C., obtainable from natural mineral oil which has been catalytically hydrogenated under high pressure and isomerized and also deparaffinized). Likewise suitable are mixtures of the abovementioned mineral carrier oils.

Examples of suitable synthetic carrier oils are polyolefins (polyalphaolefins or polyinternalolefins), (poly)esters, (poly)alkoxylates, polyethers, aliphatic polyetheramines, alkylphenol-started polyethers, alkylphenol-started polyetheramines and carboxylic esters of long-chain alkanols.

Examples of suitable polyolefins are olefin polymers having $M_n$=400 to 1800, in particular based on polybutene or polyisobutene (hydrogenated or unhydrogenated).

Examples of suitable polyethers or polyetheramines are preferably compounds comprising polyoxy-$C_2$- to $C_4$-alkylene moieties obtainable by reacting $C_2$- to $C_{60}$-alkanols, $C_6$- to $C_{30}$-alkanediols, mono- or di-$C_2$- to $C_{30}$-alkylamines, $C_1$- to $C_{30}$-alkylcyclohexanols or $C_1$- to $C_{30}$-alkylphenols with 1 to 30 mol of ethylene oxide and/or propylene oxide and/or butylene oxide per hydroxyl group or amino group, and, in the case of the polyetheramines, by subsequent reductive amination with ammonia, monoamines or polyamines. Such products are described more particularly in EP-A 310 875, EP-A 356 725, EP-A 700 985 and U.S. Pat. No. 4,877,416. For example, the polyetheramines used may be poly-$C_2$- to $C_6$-alkylene oxide amines or functional derivatives thereof. Typical examples thereof are tridecanol butoxylates or isotridecanol butoxylates, isononylphenol butoxylates and also polyisobutenol butoxylates and propoxylates, and also the corresponding reaction products with ammonia.

Examples of carboxylic esters of long-chain alkanols are more particularly esters of mono-, di- or tricarboxylic acids with long-chain alkanols or polyols, as described more particularly in DE-A 38 38 918. The mono-, di- or tricarboxylic acids used may be aliphatic or aromatic acids; particularly suitable ester alcohols or ester polyols are long-chain representatives having, for example, 6 to 24 carbon atoms. Typical representatives of the esters are adipates, phthalates, isophthalates, terephthalates and trimellitates of isooctanol, isononanol, isodecanol and isotridecanol, for example di(n- or isotridecyl) phthalate.

Further suitable carrier oil systems are described, for example, in DE-A 38 26 608, DE-A 41 42 241, DE-A 43 09 074, EP-A 452 328 and EP-A 548 617.

Examples of particularly suitable synthetic carrier oils are alcohol-started polyethers having about 5 to 35, preferably about 5 to 30, more preferably 10 to 30 and especially 15 to 30 $C_3$- to $C_6$-alkylene oxide units, for example propylene oxide, n-butylene oxide and isobutylene oxide units, or mixtures thereof, per alcohol molecule. Nonlimiting examples of suitable starter alcohols are long-chain alkanols or phenols substituted by long-chain alkyl in which the long-chain alkyl radical is especially a straight-chain or branched $C_6$- to $C_{18}$-alkyl radical. Particular examples include tridecanol and nonylphenol. Particularly preferred alcohol-started polyethers are the reaction products (polyetherification products) of monohydric aliphatic $C_6$- to $C_{18}$-alcohols with $C_3$- to $C_6$-alkylene oxides. Examples of monohydric aliphatic $C_6$-$C_{18}$-alcohols are hexanol, heptanol, octanol, 2-ethylhexanol, nonyl alcohol, decanol, 3-propylheptanol, undecanol, dodecanol, tridecanol, tetradecanol, pentadecanol, hexadecanol, octadecanol and the constitutional and positional isomers thereof. The alcohols can be used either in the form of the pure isomers or in the form of technical grade mixtures. A particularly preferred alcohol is tridecanol. Examples of $C_3$- to $C_6$-alkylene oxides are propylene oxide, such as 1,2-propylene oxide, butylene oxide, such as 1,2-butylene oxide, 2,3-butylene oxide, isobutylene oxide or tetrahydrofuran, pentylene oxide and hexylene oxide. Particular preference among these is given to $C_3$- to $C_4$-alkylene oxides, i.e. propylene oxide such as 1,2-propylene oxide and butylene oxide such as 1,2-butylene oxide, 2,3-butylene oxide and isobutylene oxide. Especially butylene oxide is used.

Further suitable synthetic carrier oils are alkoxylated alkylphenols, as described in DE-A 10 102 913.

Particular carrier oils are synthetic carrier oils, particular preference being given to the above-described alcohol-started polyethers.

The carrier oil or the mixture of different carrier oils is added to the fuel in an amount of preferably 1 to 1000 ppm by weight, more preferably of 10 to 500 ppm by weight and especially of 20 to 100 ppm by weight.

B3) Cold Flow Improvers

Suitable cold flow improvers are in principle all organic compounds which are capable of improving the flow performance of middle distillate fuels or diesel fuels under cold conditions. For the intended purpose, they must have sufficient oil solubility. More particularly, useful cold flow improvers for this purpose are the cold flow improvers (middle distillate flow improvers, MDFIs) typically used in the case of middle distillates of fossil origin, i.e. in the case of customary mineral diesel fuels. However, it is also possible to use organic compounds which partly or predominantly have the properties of a wax antisettling additive (WASA) when used in customary diesel fuels. They can also act partly or predominantly as nucleators. It is also possible to use mixtures of organic compounds effective as MDFIs and/or effective as WASAs and/or effective as nucleators.

The cold flow improver is typically selected from:
(K1) copolymers of a $C_2$- to $C_{40}$-olefin with at least one further ethylenically unsaturated monomer;
(K2) comb polymers;
(K3) polyoxyalkylenes;
(K4) polar nitrogen compounds;
(K5) sulfocarboxylic acids or sulfonic acids or derivatives thereof; and
(K6) poly(meth)acrylic esters.

It is possible to use either mixtures of different representatives from one of the particular classes (K1) to (K6) or mixtures of representatives from different classes (K1) to (K6).

Suitable $C_2$- to $C_{40}$-olefin monomers for the copolymers of class (K1) are, for example, those having 2 to 20 and especially 2 to 10 carbon atoms, and 1 to 3 and preferably 1 or 2 carbon-carbon double bonds, especially having one carbon-carbon double bond. In the latter case, the carbon-carbon double bond may be arranged either terminally (α-olefins) or internally. However, preference is given to α-olefins, particular preference to α-olefins having 2 to 6 carbon atoms, for example propene, 1-butene, 1-pentene, 1-hexene and in particular ethylene.

In the copolymers of class (K1), the at least one further ethylenically unsaturated monomer is preferably selected from alkenyl carboxylates, (meth)acrylic esters and further olefins.

When further olefins are also copolymerized, they are preferably higher in molecular weight than the abovementioned $C_2$- to $C_{40}$-olefin base monomers. When, for example, the olefin base monomer used is ethylene or propene, suitable further olefins are especially $C_{10}$- to $C_{40}$-α-olefins. Further olefins are in most cases only additionally copolymerized when monomers with carboxylic ester functions are also used.

Suitable (meth)acrylic esters are, for example, esters of (meth)acrylic acid with $C_1$- to $C_{20}$-alkanols, especially $C_1$- to $C_{10}$-alkanols, in particular with methanol, ethanol, propanol, isopropanol, n-butanol, sec-butanol, isobutanol, tert-butanol, pentanol, hexanol, heptanol, octanol, 2-ethylhexanol, nonanol and decanol, and structural isomers thereof.

Suitable alkenyl carboxylates are, for example, $C_2$- to $C_{14}$-alkenyl esters, for example the vinyl and propenyl esters, of carboxylic acids having 2 to 21 carbon atoms, whose hydrocarbyl radical may be linear or branched. Among these, preference is given to the vinyl esters. Among the carboxylic acids with a branched hydrocarbyl radical, preference is given to those whose branch is in the α position to the carboxyl group, and the α-carbon atom is more preferably tertiary, i.e. the carboxylic acid is what is called a neocarboxylic acid. However, the hydrocarbyl radical of the carboxylic acid is preferably linear.

Examples of suitable alkenyl carboxylates are vinyl acetate, vinyl propionate, vinyl butyrate, vinyl 2-ethylhexanoate, vinyl neopentanoate, vinyl hexanoate, vinyl neononanoate, vinyl neodecanoate and the corresponding propenyl esters, preference being given to the vinyl esters. A particularly preferred alkenyl carboxylate is vinyl acetate; typical copolymers of group (K1) resulting therefrom are ethylene-vinyl acetate copolymers ("EVAs"), which are some of the most frequently used.

Ethylene-vinyl acetate copolymers usable particularly advantageously and the preparation thereof are described in WO 99/29748.

Suitable copolymers of class (K1) are also those which comprise two or more different alkenyl carboxylates in copolymerized form, which differ in the alkenyl function and/or in the carboxylic acid group. Likewise suitable are copolymers which, as well as the alkenyl carboxylate(s), comprise at least one olefin and/or at least one (meth)acrylic ester in copolymerized form.

Terpolymers of a $C_2$- to $C_{40}$-α-olefin, a $C_1$- to $C_{20}$-alkyl ester of an ethylenically unsaturated monocarboxylic acid having 3 to 15 carbon atoms and a $C_2$- to $C_{14}$-alkenyl ester of a saturated monocarboxylic acid having 2 to 21 carbon atoms are also suitable as copolymers of class (K1). Terpolymers of this kind are described in WO 2005/054314. A typical terpolymer of this kind is formed from ethylene, 2-ethylhexyl acrylate and vinyl acetate.

The at least one or the further ethylenically unsaturated monomer(s) are copolymerized in the copolymers of class (K1) in an amount of preferably 1 to 50% by weight, especially 10 to 45% by weight and in particular 20 to 40% by weight, based on the overall copolymer. The main proportion in terms of weight of the monomer units in the copolymers of class (K1) therefore originates generally from the $C_2$ to $C_{40}$ base olefins.

The copolymers of class (K1) preferably have a number-average molecular weight $M_n$ of 1000 to 20 000, more preferably of 1000 to 10 000 and especially of 1000 to 8000.

Typical comb polymers of component (K2) are, for example, obtainable by the copolymerization of maleic anhydride or fumaric acid with another ethylenically unsaturated monomer, for example with an α-olefin or an unsaturated ester, such as vinyl acetate, and subsequent esterification of the anhydride or acid function with an alcohol having at least 10 carbon atoms. Further suitable comb polymers are copolymers of α-olefins and esterified comonomers, for example esterified copolymers of styrene and maleic anhydride or esterified copolymers of styrene and fumaric acid. Suitable comb polymers may also be polyfumarates or polymaleates. Homo- and copolymers of vinyl ethers are also suitable comb polymers. Comb polymers suitable as components of class (K2) are, for example, also those described in WO 2004/035715 and in "Comb-Like Polymers, Structure and Properties", N. A. Platé and V. P. Shibaev, J. Poly. Sci. Macromolecular Revs. 8, pages 117 to 253 (1974). Mixtures of comb polymers are also suitable.

Polyoxyalkylenes suitable as components of class (K3) are, for example, polyoxyalkylene esters, polyoxyalkylene ethers, mixed polyoxyalkylene ester/ethers and mixtures thereof. These polyoxyalkylene compounds preferably comprise at least one linear alkyl group, preferably at least two linear alkyl groups, each having 10 to 30 carbon atoms and a polyoxyalkylene group having a number-average molecular weight of up to 5000. Such polyoxyalkylene compounds are described, for example, in EP-A 061 895 and also in U.S.

Pat. No. 4,491,455. Particular polyoxyalkylene compounds are based on polyethylene glycols and polypropylene glycols having a number-average molecular weight of 100 to 5000. Additionally suitable are polyoxyalkylene mono- and diesters of fatty acids having 10 to 30 carbon atoms, such as stearic acid or behenic acid.

Polar nitrogen compounds suitable as components of class (K4) may be either ionic or nonionic and preferably have at least one substituent, especially at least two substituents, in the form of a tertiary nitrogen atom of the general formula $>NR^7$ in which $R^7$ is a $C_8$- to $C_{40}$-hydrocarbyl radical. The nitrogen substituents may also be quaternized, i.e. be in cationic form. Examples of such nitrogen compounds are ammonium salts and/or amides which are obtainable by the reaction of at least one amine substituted by at least one hydrocarbyl radical with a carboxylic acid having 1 to 4 carboxyl groups or with a suitable derivative thereof. The amines preferably comprise at least one linear $C_8$- to $C_{40}$-alkyl radical. Primary amines suitable for preparing the polar nitrogen compounds mentioned are, for example, octylamine, nonylamine, decylamine, undecylamine, dodecylamine, tetradecylamine and the higher linear homologs; secondary amines suitable for this purpose are, for example, dioctadecylamine and methylbehenylamine. Also suitable for this purpose are amine mixtures, especially amine mixtures obtainable on the industrial scale, such as fatty amines or hydrogenated tallamines, as described, for example, in Ullmann's Encyclopedia of Industrial Chemistry, 6th Edition, "Amines, aliphatic" chapter. Acids suitable for the reaction are, for example, cyclohexane-1,2-dicarboxylic acid, cyclohexene-1,2-dicarboxylic acid, cyclopentane-1,2-dicarboxylic acid, naphthalenedicarboxylic acid, phthalic acid, isophthalic acid, terephthalic acid, and succinic acids substituted by long-chain hydrocarbyl radicals.

More particularly, the component of class (K4) is an oil-soluble reaction product of poly($C_2$- to $C_{20}$-carboxylic acids) having at least one tertiary amino group with primary or secondary amines. The poly($C_2$- to $C_{20}$-carboxylic acids) which have at least one tertiary amino group and form the basis of this reaction product comprise preferably at least 3 carboxyl groups, especially 3 to 12 and in particular 3 to 5 carboxyl groups. The carboxylic acid units in the polycarboxylic acids have preferably 2 to 10 carbon atoms, and are especially acetic acid units. The carboxylic acid units are suitably bonded to the polycarboxylic acids, usually via one or more carbon and/or nitrogen atoms. They are preferably attached to tertiary nitrogen atoms which, in the case of a plurality of nitrogen atoms, are bonded via hydrocarbon chains.

The component of class (K4) is preferably an oil-soluble reaction product based on poly($C_2$- to $C_{20}$-carboxylic acids) which have at least one tertiary amino group and are of the general formula IIa or IIb

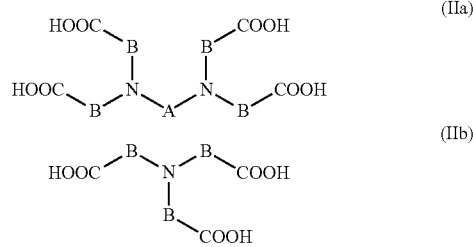

in which the variable A is a straight-chain or branched $C_2$- to $C_6$-alkylene group or the moiety of the formula III

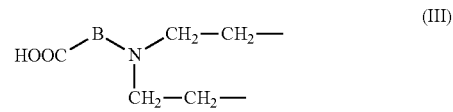

and the variable B is a $C_1$- to $C_{19}$-alkylene group. The compounds of the general formulae IIa and IIb especially have the properties of a WASA.

Moreover, the preferred oil-soluble reaction product of component (K4), especially that of the general formula IIa or IIb, is an amide, an amide-ammonium salt or an ammonium salt in which no, one or more carboxylic acid groups have been converted to amide groups.

Straight-chain or branched $C_2$- to $C_6$-alkylene groups of the variable A are, for example, 1,1-ethylene, 1,2-propylene, 1,3-propylene, 1,2-butylene, 1,3-butylene, 1,4-butylene, 2-methyl-1,3-propylene, 1,5-pentylene, 2-methyl-1,4-butylene, 2,2-dimethyl-1,3-propylene, 1,6-hexylene (hexamethylene) and especially 1,2-ethylene. The variable A comprises preferably 2 to 4 and especially 2 or 3 carbon atoms.

$C_1$- to $C_{19}$-alkylene groups of the variable B are, for example, 1,2-ethylene, 1,3-propylene, 1,4-butylene, hexamethylene, octamethylene, decamethylene, dodecamethylene, tetradecamethylene, hexadecamethylene, octadecamethylene, nonadecamethylene and especially methylene. The variable B comprises preferably 1 to 10 and especially 1 to 4 carbon atoms.

The primary and secondary amines as a reaction partner for the polycarboxylic acids to form component (K4) are typically monoamines, especially aliphatic monoamines. These primary and secondary amines may be selected from a multitude of amines which bear hydrocarbyl radicals which may optionally be bonded to one another.

These parent amines of the oil-soluble reaction products of component (K4) are usually secondary amines and have the general formula $HN(R^8)_2$ in which the two variables $R^8$ are each independently straight-chain or branched $C_{10}$- to $C_{30}$-alkyl radicals, especially $C_{14}$- to $C_{24}$-alkyl radicals. These relatively long-chain alkyl radicals are preferably straight-chain or only slightly branched. In general, the secondary amines mentioned, with regard to their relatively long-chain alkyl radicals, derive from naturally occurring fatty acids and from derivatives thereof. The two $R^8$ radicals are preferably identical.

The secondary amines mentioned may be bonded to the polycarboxylic acids by means of amide structures or in the form of the ammonium salts; it is also possible for only a portion to be present as amide structures and another portion as ammonium salts. Preferably only few, if any, free acid groups are present. The oil-soluble reaction products of component (K4) are preferably present completely in the form of the amide structures.

Typical examples of such components (K4) are reaction products of nitrilotriacetic acid, of ethylenediaminetetraacetic acid or of propylene-1,2-diaminetetraacetic acid with in each case 0.5 to 1.5 mol per carboxyl group, especially 0.8 to 1.2 mol per carboxyl group, of dioleylamine, dipalmitamine, dicocoamine, distearylamine, dibehenylamine or especially ditallamine. A particularly preferred component (K4) is the reaction product of 1 mol of ethylenediaminetetraacetic acid and 4 mol of hydrogenated ditallamine.

Further typical examples of component (K4) include the N,N-dialkylammonium salts of 2-N',N'-dialkylamidobenzoates, for example the reaction product of 1 mol of phthalic anhydride and 2 mol of ditallamine, the latter being hydrogenated or unhydrogenated, and the reaction product of 1 mol of an alkenylspirobislactone with 2 mol of a dialkylamine, for example ditallamine and/or tallamine, the latter two being hydrogenated or unhydrogenated.

Further typical structure types for the component of class (K4) are cyclic compounds with tertiary amino groups or condensates of long-chain primary or secondary amines with carboxylic acid-containing polymers, as described in WO 93/18115.

Sulfocarboxylic acids, sulfonic acids or derivatives thereof which are suitable as cold flow improvers of the component of class (K5) are, for example, the oil-soluble carboxamides and carboxylic esters of ortho-sulfobenzoic acid, in which the sulfonic acid function is present as a sulfonate with alkyl-substituted ammonium cations, as described in EP-A 261 957.

Poly(meth)acrylic esters suitable as cold flow improvers of the component of class (K6) are either homo- or copolymers of acrylic and methacrylic esters. Preference is given to copolymers of at least two different (meth)acrylic esters which differ with regard to the esterified alcohol. The copolymer optionally comprises another different olefinically unsaturated monomer in copolymerized form. The weight-average molecular weight of the polymer is preferably 50 000 to 500 000. A particularly preferred polymer is a copolymer of methacrylic acid and methacrylic esters of saturated $C_{14}$- and $C_{15}$-alcohols, the acid groups having been neutralized with hydrogenated tallamine. Suitable poly(meth)acrylic esters are described, for example, in WO 00/44857.

The cold flow improver or the mixture of different cold flow improvers is added to the middle distillate fuel or diesel fuel in a total amount of preferably 10 to 5000 ppm by weight, more preferably of 20 to 2000 ppm by weight, even more preferably of 50 to 1000 ppm by weight and especially of 100 to 700 ppm by weight, for example of 200 to 500 ppm by weight.

B4) Lubricity Improvers

Suitable lubricity improvers or friction modifiers are based typically on fatty acids or fatty acid esters. Typical examples are tall oil fatty acid, as described, for example, in WO 98/004656, and glyceryl monooleate. The reaction products, described in U.S. Pat. No. 6,743,266 B2, of natural or synthetic oils, for example triglycerides, and alkanolamines are also suitable as such lubricity improvers.

B5) Corrosion Inhibitors Other than the Polymer Described

Suitable corrosion inhibitors are, for example, succinic esters, in particular with polyols, fatty acid derivatives, for example oleic esters, oligomerized fatty acids, substituted ethanolamines, and products sold under the trade name RC 4801 (Rhein Chemie Mannheim, Germany), Irgacor® L12 (BASF SE) or HiTEC 536 (Ethyl Corporation).

B6) Demulsifiers

Suitable demulsifiers are, for example, the alkali metal or alkaline earth metal salts of alkyl-substituted phenol- and naphthalenesulfonates and the alkali metal or alkaline earth metal salts of fatty acids, and also neutral compounds such as alcohol alkoxylates, e.g. alcohol ethoxylates, phenol alkoxylates, e.g. tert-butylphenol ethoxylate or tert-pentylphenol ethoxylate, fatty acids, alkylphenols, condensation products of ethylene oxide (EO) and propylene oxide (PO), for example including in the form of EO/PO block copolymers, polyethyleneimines or else polysiloxanes.

B7) Dehazers

Suitable dehazers are, for example, alkoxylated phenol-formaldehyde condensates, for example the products available under the trade names NALCO 7D07 (Nalco) and TOLAD 2683 (Petrolite).

B8) Antifoams

Suitable antifoams are, for example, polyether-modified polysiloxanes, for example the products available under the trade names TEGOPREN 5851 (Goldschmidt), Q 25907 (Dow Corning) and RHODOSIL (Rhone Poulenc).

B9) Cetane Number Improvers

Suitable cetane number improvers are, for example, aliphatic nitrates such as 2-ethylhexyl nitrate and cyclohexyl nitrate and peroxides such as di-tert-butyl peroxide.

B10) Antioxidants

Suitable antioxidants are, for example, substituted phenols, such as 2,6-di-tert-butylphenol and 6-di-tert-butyl-3-methylphenol, and also phenylenediamines such as N,N'-di-sec-butyl-p-phenylenediamine.

B11) Metal Deactivators

Suitable metal deactivators are, for example, salicylic acid derivatives such as N,N'-disalicylidene-1,2-propanediamine.

B12) Solvents

Suitable solvents are, for example, nonpolar organic solvents such as aromatic and aliphatic hydrocarbons, for example toluene, xylenes, white spirit and products sold under the trade names SHELLSOL (Royal Dutch/Shell Group) and EXXSOL (ExxonMobil), and also polar organic solvents, for example alcohols such as 2-ethylhexanol, decanol and isotridecanol. Such solvents are usually added to the diesel fuel together with the aforementioned additives and coadditives, which they are intended to dissolve or dilute for better handling.

C) Fuels

The inventive additive is outstandingly suitable as a fuel additive and can be used in principle in any fuels. It brings about a whole series of advantageous effects in the operation of internal combustion engines with fuels. Preference is given to using the inventive quaternized additive in middle distillate fuels, especially diesel fuels.

The present invention therefore also provides fuels, especially middle distillate fuels, with a content of the inventive quaternized additive which is effective as an additive for achieving advantageous effects in the operation of internal combustion engines, for example of diesel engines, especially of direct injection diesel engines, in particular of diesel engines with common rail injection systems. This effective content (dosage rate) is generally 10 to 5000 ppm by weight, preferably 20 to 1500 ppm by weight, especially 25 to 1000 ppm by weight, in particular 30 to 750 ppm by weight, based in each case on the total amount of fuel.

Middle distillate fuels such as diesel fuels or heating oils are preferably mineral oil raffinates which typically have a boiling range from 100 to 400° C. These are usually distillates having a 95% point up to 360° C. or even higher. These may also be what is called "ultra low sulfur diesel" or "city diesel", characterized by a 95% point of, for example, not more than 345° C. and a sulfur content of not more than 0.005% by weight or by a 95% point of, for example, 285° C. and a sulfur content of not more than 0.001% by weight. In addition to the mineral middle distillate fuels or diesel fuels obtainable by refining, those obtainable by coal gasification or gas liquefaction ["gas to liquid" (GTL) fuels] or by biomass liquefaction ["biomass to liquid" (BTL) fuels] are also suitable. Also suitable are mixtures of the aforementioned middle distillate fuels or diesel fuels with renewable fuels, such as biodiesel or bioethanol.

The qualities of the heating oils and diesel fuels are laid down in detail, for example, in DIN 51603 and EN 590 (cf. also Ullmann's Encyclopedia of Industrial Chemistry, 5th edition, Volume A12, p. 617 ff.).

In addition to the use thereof in the abovementioned middle distillate fuels of fossil, vegetable or animal origin, which are essentially hydrocarbon mixtures, the inventive quaternized additive can also be used in mixtures of such middle distillates with biofuel oils (biodiesel). Such mixtures are also encompassed by the term "middle distillate fuel" in the context of the present invention. They are commercially available and usually comprise the biofuel oils in minor amounts, typically in amounts of 1 to 30% by weight, especially of 3 to 10% by weight, based on the total amount of middle distillate of fossil, vegetable or animal origin and biofuel oil.

Biofuel oils are generally based on fatty acid esters, preferably essentially on alkyl esters of fatty acids which derive from vegetable and/or animal oils and/or fats. Alkyl esters are typically understood to mean lower alkyl esters, especially $C_1$- to $C_4$-alkyl esters, which are obtainable by transesterifying the glycerides which occur in vegetable and/or animal oils and/or fats, especially triglycerides, by means of lower alcohols, for example ethanol or in particular methanol ("FAME"). Typical lower alkyl esters based on vegetable and/or animal oils and/or fats, which find use as a biofuel oil or components thereof, are, for example, sunflower methyl ester, palm oil methyl ester ("PME"), soya oil methyl ester ("SME") and especially rapeseed oil methyl ester ("RME").

The middle distillate fuels or diesel fuels are more preferably those having a low sulfur content, i.e. having a sulfur content of less than 0.05% by weight, preferably of less than 0.02% by weight, more particularly of less than 0.005% by weight and especially of less than 0.001% by weight of sulfur.

Useful gasoline fuels include all commercial gasoline fuel compositions. One typical representative which shall be mentioned here is the Eurosuper base fuel to EN 228, which is customary on the market. In addition, gasoline fuel compositions of the specification according to WO 00/47698 are also possible fields of use for the present invention.

The inventive quaternized additive is especially suitable as a fuel additive in fuel compositions, especially in diesel fuels, for overcoming the problems outlined at the outset in direct injection diesel engines, in particular in those with common rail injection systems.

The invention is now described in detail by the working examples which follow. More particularly, the test methods specified hereinafter are part of the general disclosure of the application and are not restricted to the specific working examples.

EXPERIMENTAL SECTION

A. General Test Methods
1. DW10 Test—Determination of Power Loss as a Result of Injector Deposits in the Common Rail Diesel Engine The tests are based on CEC test procedure F-098-08 Issue 5. This is done using the same test setup and engine type (PEUGEOT DW10) as in the CEC procedure.

The alteration and special features are described in the use examples which follow.

2. IDID Test—Determination of Additive Effect on Internal Injector Deposits

The formation of deposits within the injector was characterized by the deviations in the exhaust gas temperatures of the cylinders at the cylinder outlet on cold starting of the DW10 engine.

To promote the formation of deposits, 1 mg/l of sodium salt of an organic acid, 20 mg/l of dodecenylsuccinic acid and 10 mg/l of water were added to the fuel.

The dodecenylsuccinic acid used was obtained by hydrolysis of dodecenylsuccinic anhydride, isomer mixture from Aldrich, CAS no. 26544-38-7.

The test is conducted as a dirty-up clean-up test (DU-CU).

DU-CU is based on CEC test procedure F-098-08 Issue 5.

The DU-CU test consists of two individual tests which are run in succession. The first test serves to form deposits (DU), the second to remove the deposits (CU).

After the DU run, after a rest phase of at least eight hours, a cold start of the engine is conducted, followed by idling for 10 minutes.

Thereafter, the CU fuel is used to start the CU without deinstalling and cleaning the injectors. After the CU run over 8 h, after a rest phase of at least eight hours, a cold start of the engine is conducted, followed by idling for 10 minutes. The evaluation is effected by the comparison of the temperature profiles for the individual cylinders after the cold start in the DU and CU runs.

The IDID test indicates the formation of internal deposits in the injector. The characteristic used in this test is the exhaust gas temperature of the individual cylinders. In an injector system without IDIDs, the exhaust gas temperatures of the cylinders increase homogeneously. In the presence of IDIDs, the exhaust gas temperatures of the individual cylinders do not increase homogeneously and deviate from one another.

The temperature sensors are beyond the cylinder head outlet in the exhaust gas manifold. Significant deviation of the individual cylinder temperatures (e.g. >20° C.) indicates the presence of internal injector deposits (IDIDs).

The tests (DU and CU) are each conducted with run time 8 h. The one-hour test cycle from CEC F-098-08 (see FIG. 1) is run through 8 times in each case. In the event of deviations of the individual cylinder temperatures of greater than 45° C. from the mean for all 4 cylinders, the test is stopped early.

Alteration and special features: Cleaned injectors were installed before the start of each DU test run. The cleaning time in the ultrasound bath at 60° C., in water+10% Superdecontamine, was 4 h.

3. Determination of Acid Number

Determination of Efficacy Value 50 mL of 0.5 molar ethanolic KOH are heated in a 150 mL COD tube provided with an air cooler to 95° C. for three (3) hours. The air cooler is purged with 30 mL of ethanol and then the solution is potentiographically titrated with 0.5 molar aqueous hydrochloric acid (HCl).

Determination of the Sample

About 1 g of sample is weighed into a 150 mL COD tube and dissolved in 50 mL of 0.5 molar ethanolic KOH. The COD tube is provided with an air cooler and placed into a stirred block thermostat preheated to 95° C. After three (3) hours, the COD tube is removed from the heating block and rinsed with 30 mL of ethanol, and the solution is potentiographically titrated with 0.5 molar aqueous hydrochloric acid (HCl).

B. Synthesis Examples

Synthesis Example 1

(MA/C20-C24, in Wibarcan®)

A 4 L glass reactor with anchor stirrer was initially charged with a mixture of $C_{20}$-$C_{24}$ olefins (901.4 g, average molar mass 296 g/mol) and Wibarcan® (1113.0 g, from Wibarco). The mixture was heated to 150° C. in a nitrogen stream and while stirring. To this were added, within 5 h, a solution of di-tert-butyl peroxide (12.2 g, from Akzo Nobel) in Wibarcan® (107.7 g) and molten maleic anhydride (298.6 g). The reaction mixture was stirred at 150° C. for 1 h and then cooled to 95° C. At this temperature, water (43.4 g) was added within 3 h and then stirring was continued for 11 h.

GPC (eluent: THF+1% trifluoroacetic acid, polystyrene standard) showed a polymer with Mn=619 g/mol, Mw=2780 g/mol, polydispersity 4.5.

The copolymer had a ratio of carbon atoms per acid group of 13; the acid number was 210.8 mg KOH/g.

Synthesis Example 2

(MA/C20-C24, in Solvesso™ 150)

A 2 L glass reactor with anchor stirrer was initially charged with a mixture of $C_{20}$-$C_{24}$ olefins (363.2 g, average molar mass 296 g/mol) and Solvesso™ 150 (270.2 g, DHC Solvent Chemie GmbH). The mixture was heated to 150° C. in a nitrogen stream and while stirring. To this were added, within 5 h, a solution of di-tert-butyl peroxide (24.67 g, from Akzo Nobel) in Solvesso™ 150 (217.0 g) and molten maleic anhydride (120.3 g). The reaction mixture was stirred at 150° C. for 1 h and then cooled to 95° C. At this temperature, water (19.9 g) was added within 3 h and then stirring was continued for 11 h.

GPC (eluent: THF+1% trifluoroacetic acid, polystyrene standard) showed a polymer with Mn=1330 g/mol, Mw=2700 g/mol, polydispersity 2.0.

The copolymer had a ratio of carbon atoms per acid group of 13; the acid number was 210.8 mg KOH/g.

Synthesis Example 3

(MA/C20-C24, in Solvesso™ 150)

A 2 L glass reactor with anchor stirrer was initially charged with a mixture of $C_{20}$-$C_{24}$ olefins (363.2 g, average molar mass 296 g/mol) and Solvesso™ 150 (231.5 g, DHC Solvent Chemie GmbH). The mixture was heated to 160° C. in a nitrogen stream and while stirring. To this were added, within 5 h, a solution of di-tert-butyl peroxide (29.6 g, from Akzo Nobel) in Solvesso™ 150 (260.5 g) and molten maleic anhydride (120.3 g). The reaction mixture was stirred at 150° C. for 1 h and then cooled to 95° C. At this temperature, water (19.9 g) was added within 3 h and then stirring was continued for 11 h.

GPC (eluent: THF+1% trifluoroacetic acid, polystyrene standard) showed a polymer with Mn=1210 g/mol, Mw=2330 g/mol, polydispersity 1.9.

The copolymer had a ratio of carbon atoms per acid group of 13; the acid number was 210.8 mg KOH/g.

Synthesis Example 4

(MA/C20-C24, in Solvesso™ 150)

A 2 L glass reactor with anchor stirrer was initially charged with a mixture of $C_{20}$-$C_{24}$ olefins (371.8 g, average molar mass 296 g/mol) and Solvesso™ 150 (420.7 g, DHC Solvent Chemie GmbH). The mixture was heated to 150° C. in a nitrogen stream and while stirring. To this were added, within 3 h, a solution of di-tert-butyl peroxide (5.71 g, from Akzo Nobel) in Solvesso™ 150 (50.2 g) and molten maleic anhydride (123.2 g). The reaction mixture was stirred at 150° C. for 1 h and then cooled to room temperature. A 250 mL two-neck flask with attached reflux condenser was initially charged with 160 g of the copolymer thus obtained and 3.63 g of water. The mixture was stirred at 95° C. for 16 h.

The copolymer had a ratio of carbon atoms per acid group of 13; the acid number was 210.8 mg KOH/g.

D. Use Examples

Use Example 1

DW10 Zn Engine Test (Clean-Up)

The test was conducted with a Peugeot DW10 engine, which is used according to the standard CEC F-98-08 procedure, except that more severe conditions were used in the dirty-up part:

I. Dirty-up:

The more severe conditions allow much quicker formation of injector deposits and hence a quicker power loss determination than under standard CEC F-98-08 conditions: The engine was operated at full load (4000 rpm) with EN590 B7 Aral, unadditized, containing 3 mg/kg Zn, for 4.28 h. The results are compiled in the following table:

II. Clean-up:

For the clean-up test, shortened to 8 h as per the CEC F-98-08 procedure, with 1 ppm of Zn and EN590 B7 Aral fuel, unadditized, comprising inventive additives, the results compiled in the following table were achieved.

| Test | Additives | Engine power before test kW | Engine power after test kW | Change in power in test % |
|---|---|---|---|---|
| Dirty-up (quick method), full load | 3 ppm Zn | 98.3 | 94.5 | −3.9 |
| Clean-up, 8 h, CEC F-98-08 procedure | 1 ppm Zn and 28 ppm active constituent, synthesis example 4 | 94.1 | 96.4 | +2.4 |
| Dirty-up (quick method), full load | 3 ppm Zn | 95.8 | 90.5 | −5.5 |
| Clean-up, 8 h, CEC F-98-08 procedure | 1 ppm Zn and 50 ppm active constituent, synthesis example 2 | 90.5 | 94.1 | +4.0 |

The compounds described in this invention are effective against the formation of deposits in direct injection engines, such as Peugeot DW10, under testing as per CEO F-98-08, and are capable of earlier removal of the deposits formed.

Use Example 2

DW10 Na Soap IDID Test (Clean-Up)

To examine the influence of the additives on the performance of direct injection diesel engines, as a further test method, the IDID engine test, in which the exhaust gas temperatures in the cylinders at the cylinder outlet were determined on cold starting of the DW10 engine, was. A direct injection diesel engine with common rail system from the manufacturer Peugeot as per test method CEC F-098-08 was used. The fuel used was a commercial B7 diesel fuel according to EN 590 from Aral. To artificially induce the formation of deposits, 1 ppm by weight of sodium naphthenate and 20 ppm by weight of dodecenylsuccinic acid were added thereto in each case.

Similarly to the CEC F-98-08 method, the engine power is measured during the test. The test consisted of two parts:

I. Dirty-up:

The test was conducted without addition of compounds according to this invention. The test was shortened to 8 hours; the CEC F-98-08 method was conducted without addition of Zn. If significant deviations in exhaust gas temperatures were observed, the test was stopped before the 8-hour mark was reached, in order to avoid engine damage. After the dirty-up run, the engine was left to cool and then restarted and operated in idling mode for 5 minutes. During these 5 minutes, the engine was warmed up. The exhaust gas temperature of each cylinder was recorded. The smaller the differences between the exhaust gas temperatures found, the smaller the amount of IDIDs formed.

The exhaust gas temperatures of the 4 cylinders ("C1" to "C4") were measured at each of the cylinder outlets after 0 minutes ("θ0") and after 5 minutes ("θ5"). The results of the exhaust gas temperature measurements with average values ("Δ") and the greatest differences from Δ in the downward ("−") and upward ("+") directions for the two test runs are summarized in the overview which follows.

II. Clean-up:

The test was shortened to 8 hours; the CEC F-98-08 method was conducted without addition of Zn. However, 1 ppm by weight of sodium naphthenate and 20 ppm by weight of dodecenylsuccinic acid, and also an inventive compound, were added in each case, and the engine power was determined.

After the clean-up, the engine was cooled and restarted. The exhaust gas temperature of each cylinder was recorded. The smaller the differences between the exhaust gas temperatures found, the smaller the amount of IDIDs formed.

The exhaust gas temperatures of the 4 cylinders ("C1" to "C4") were measured at each of the cylinder outlets after 0 minutes ("θ0") and after 5 minutes ("θ5"). The results of the exhaust gas temperature measurements with average values ("Δ") and the greatest differences from Δ in the downward ("−") and upward ("+") directions are summarized in the overview which follows. The following results were found:

Dirty-up Clean-up Sequence 1:

Dirty-up:

Significant deviations in exhaust gas temperatures were found during the test and so it was stopped after 3 hours, in order to avoid engine damage.

After Dirty-up:

| θ0 | C1: 34° C. | C2: 31° C. | C3: 28° C. | C4: 27° C. |
| θ5 | C1: 119° C. | C2: 117° C. | C3: 41° C. | C4: 45° C. |

Δ: 80.5° C. (+38.5° C./−39.5° C.)

Significant deviations from the mean and significant differences between the individual cylinders show the presence of IDIDs.

Clean-up:

After clean-up with 168 ppm of additive according to synthesis example 4 in the presence of 1 ppm of Na+20 ppm of dodecenylsuccinic acid:

| θ0 | C1: 28° C. | C2: 27° C. | C3: 27° C. | C4: 26° C. |
| θ5 | C1: 74° C. | C2: 77° C. | C3: 60° C. | C4: 66° C. |

Δ: 69.3° C. (−9.3° C./+7.7° C.)

The deviation from the mean temperature of the exhaust gases is low, which suggests the removal of IDIDs.

Dirty-up Clean-up Sequence 2:

After Dirty-up (8h):

| θ0 | C1: 40° C. | C2: 28° C. | C3: 38° C. | C4: 30° C. |
| θ5 | C1: 274° C. | C2: 293° C. | C3: 112° C. | C4: 57° C. |

Δ: 184° C. (+109° C./−127° C.)

Extremely high deviations from the mean and significant differences between the individual cylinders show the presence of significant IDIDs.

Clean-up

After clean-up with 140 ppm of additive according to synthesis example 4 in the presence of 1 ppm of Na+20 ppm of dodecenylsuccinic acid:

| θ0 | C1: 44° C. | C2: 43° C. | C3: 44° C. | C4: 45° C. |
| θ5 | C1: 78° C. | C2: 78° C. | C3: 83° C. | C4: 80° C. |

Δ: 80° C. (−2° C./+3° C.)

The deviation from the mean temperature of the exhaust gases is very low, which suggests the removal of the significant IDIDs.

The compounds according to this invention are thus very effective against IDID formation in engines with direct injection, such as Peugeot DW10, in a test similar to the CEO F-98-08 procedure.

Comparative Example 1

After Dirty-up

| θ0 | C1: 23° C. | C2: 22° C. | C3: 22° C. | C4: 21° C. |
| θ5 | C1: 84° C. | C2: 72° C. | C3: 80° C. | C4: 63° C. |

Δ: 74.75° C. (+9.25° C./−11.75° C.)

Slight deviations from the mean and slight differences between the individual cylinders show merely minor presence of IDIDs.

Clean-up

After clean-up with 150 ppm by weight of dodecenylsuccinic acid in the presence of 1 ppm of Na+20 ppm of dodecenylsuccinic acid:

| θ0 | C1: 21° C. | C2: 21° C. | C3: 20° C. | C4: 20° C. |
| θ5 | C1: 79° C. | C2: 77° C. | C3: 81° C. | C4: 63° C. |

Δ: 75° C. (+6° C./−10° C.)

The values from the dirty-up run were improved only insignificantly.

Comparative Example 2

After Dirty-Up

| θ0 | C1: 10° C. | C2: 24° C. | C3: 29° C. | C4: 41° C. |
| θ5 | C1: 23° C. | C2: 84° C. | C3: 103° C. | C4: 112° C. |

Δ: 80.5° C. (+31.5° C./−57.5° C.)

Significant deviations from the mean and significant differences between the individual cylinders show the presence of IDIDs.

Clean-Up

After clean-up with 150 ppm by weight of polyisobutenesuccinic acid (from polyisobutene with molar mass 1000) in the presence of 1 ppm of Na+20 ppm of dodecenylsuccinic acid:

| θ0 | C1: 15° C. | C2: 41° C. | C3: 51° C. | C4: 46° C. |
|---|---|---|---|---|
| θ5 | C1: 24° C. | C2: 70° C. | C3: 102° C. | Z4: 100° C. |

Δ: 74° C. (+28° C./−50° C.)

The values from the dirty-up run were improved only insignificantly and show that the deposits present were not significantly removed.

Use Example 3

DW10 Na Power Loss Test

To examine the efficacy of the inventive compounds against power loss caused by metals such as Na, K and others (and not by Zn as described above), an IDID engine test was used. During the run, the power is measured to CEC F-098-08.

| Test | Additive | Engine power before the test [kW] | Engine power after the test [kW] | Change in power in the test [%] |
|---|---|---|---|---|
| Dirty-up 8 h | 1 ppm Na + 20 ppm dodecenylsuccinic acid | 96.8 | 88.8 | −8.3 |
| Clean-up 8 h | 1 ppm Na + 20 ppm dodecenylsuccinic acid and 140 ppm active constituent, synthesis example 4 | 88.4 | 91.4 | +3.4 |

The compounds according to this invention are effective against deposits caused by metals other than Zn in engines with direct injection, as shown in the above Na power loss test. The compounds effectively prevent power loss and can also be used to remove deposits.

Use Example 4

Filterability Test (IP 387)

The formation of residues in the fuel and injection system arises from inadequate solubility of the residues formed and of the constituents and precursors thereof.

IP 387/97 tests were conducted in order to determine the tendency of the fuel to block a filter, by determining the amount of agglomerate and small insoluble particles in the fuel. In this test, fuel is conveyed through a particular glass fiber filter medium at a constant flow rate of 20 mL/min. The pressure differential across the filter is monitored and the volume of fuel conveyed through the filter before attainment of a particular pressure differential is measured. The test is ended when either 300 mL of fuel has been filtered or the pressure differential exceeds 105 kPa. A relatively low pressure differential after filtration of 300 mL of fuel indicates a low tendency to block filters.

In the test, a fuel according to EN 590 without performance additives was used as base fuel. In order to examine the tendency of the fuel to block the filter through salt formation, the fuel was admixed with 3 mg/L of sodium ions (by addition of sodium naphthenate) and 20 mg/L of dodecenylsuccinic acid.

a) In the IP 387 test, the base fuel admixed with 3 mg/L of sodium and 20 mg/L of dodecenylsuccinic acid already gave a pressure differential of 105 kPa after filtration of 240 mL of fuel.

b) Addition of 250 mg/kg of the product prepared according to synthesis example 4 to the base fuel in addition to 3 mg/L of sodium and 20 mg/L of dodecenylsuccinic acid, after filtration of 300 mL of fuel, showed a pressure differential of only 26 kPa.

This clearly shows that the inventive example improves the filterability of the fuel and hence can prevent the deposition of residues in the fuel and injector system.

Use Example 5

Test for Determination of the Formation of Deposits in Fuels at Elevated Temperature (JFTOT Test According to ASTM D3241)

In the test, a fuel according to EN 590 without performance additives was used as base fuel. The test was conducted according to ASTM D3241 without a preliminary filter. A temperature in the heating tube of 260° C. was established; the fuel flow rate was 3 mL/minute; the total duration was 150 min.

The test was ended as soon as the pressure drop exceeded 250 mm Hg. The backpressure at the end of the test or the time until attainment of the pressure drop of 25 mm Hg was used to determine the formation rate of deposits. A small pressure drop at the end of the test or a long period until attainment of the value of 25 mm Hg in the test show a low tendency to formation of deposits.

a) The base fuel admixed with 3 mg/L of sodium and 20 mg/L of dodecenylsuccinic acid, in the test, led to a backpressure of 250 mm Hg after 80 min; a backpressure of 25 mm Hg was b) Addition of 500 mg/kg of the product prepared according to synthesis example 4 to the base fuel in addition to 3 mg/L of sodium and 20 mg/L of dodecenylsuccinic acid showed a backpressure of zero at the end of the test after 150 min.

c) Addition of 500 mg/kg of a dodecenylsuccinimide of TEPA, prepared by condensation reaction of dodecenylsuccinic anhydride with tetraethylenepentamine (TEPA) as a 50% by weight solution in 2-ethylhexanol, to the base fuel in addition to 3 mg/L of sodium and 20 mg/L of dodecenylsuccinic acid, in the test, led to a backpressure of 250 mm Hg after only 28 min; a backpressure of 25 mm Hg was attained after only 6 min. In addition, brown deposits were detected in the test apparatus.

d) Addition of 500 mg/kg of the product prepared according to synthesis example 4 to the fuel mixture according to c) led, at the end of the test after 150 min, to a backpressure of only 6 mm Hg.

This shows clearly that the inventive example can prevent the deposition of residues in the fuel at relatively high temperatures.

Use Example 6

DW10 Polymeric IDID Test (Clean-up)

To examine the influence of the additives on the performance of direct injection diesel engines, as a further test method, the IDID engine test, in which the exhaust gas temperature in the cylinders at the cylinder outlet was determined on cold starting of the DW10 engine, was. A direct injection diesel engine with common rail system from the manufacturer Peugeot as per test method CEC F-098-008 was used.

The fuel used was DF-79-07 BATCH 7 fuel from Haltermann.

To this fuel were added 50 mg/kg of the product of the condensation reaction of dodecenylsuccinic anhydride isomer mixture (CAS number 26544-38-7) with tetraethylenepentamine (TEPA) (CAS number 112-57-2), which was obtained as follows:

Tetraethylenepentamine (1.0 eq, M=189.3 g/mol) was added dropwise at 100° C. to a solution of dodecenylsuccinic anhydride isomer mixture (1.0 eq, by hydrolysis number) in Solvent Naphtha Naphthalene depleted. This was followed by heating to 170° C. and distillative removal of water formed. Thereafter, 2-ethylhexanol was added, and the mixture was cooled and discharged.

The amount of solvents was chosen such that the product had a concentration of 50% (w/w) in a Solvent Naphtha Naphthalene depleted/2-ethylhexanol 4:1 (w/w) solvent mixture.

I. Dirty-up

The test was conducted without addition of compounds according to this invention and was shortened to 8 hours; the CEC F-98-08 method was conducted without addition of zinc.

After the dirty-up run, the engine was cooled down and restarted and operated in idling mode for 5 minutes. During these 5 minutes, the engine was warmed up. The exhaust gas temperature of each cylinder was recorded. The smaller the differences between the exhaust gas temperatures found, the smaller the amount of IDIDs formed.

The exhaust gas temperatures of the 4 cylinders ("C1" to "C4") were measured at each of the cylinder outlets after 0 minutes ("θ0") and after 5 minutes ("θ5"). The results of the exhaust gas temperature measurements with average values ("Δ") and the greatest differences from Δ in the downward ("−") and upward ("+") directions are summarized in the overview which follows.

II. Clean-up

The test was shortened to 8 hours; the CEC F-98-08 method was conducted without addition of zinc.

50 mg/kg of the product of the condensation reaction of dodecenylsuccinic anhydride with tetraethylenepentamine (TEPA) (prepared as described in use example 6) were added to synthetically induce the formation of deposits.

In addition, 100 mg/kg of the product prepared according to synthesis example 4 were added to the fuel mixture.

The following results were found:

After Dirty-up

| θ0 | C1: 45° C. | C2: 47° C. | C3: 33° C. | C4: 45° C. |
|---|---|---|---|---|
| θ5 | C1: 82° C. | C2: 104° C. | C3: 47° C. | C4: 113° C. |

Δ: 86.5° C. (−39.5° C./+26.5° C.)

Significant deviations from the mean and significant differences between the individual cylinders show the presence of IDIDs.

After Clean-up

| θ0 | C1: 41° C. | C2: 41° C. | C3: 39° C. | C4: 43° C. |
|---|---|---|---|---|
| θ5 | C1: 82° C. | C2: 81° C. | C3: 80° C. | C4: 82° C. |

Δ: 81.3° C. (−1.3° C./+0.7° C.)

The deviation from the mean temperature of the exhaust gases is low, which suggests the removal of IDIDs.

The test result after clean-up shows that the compounds according to the invention are very effective in the prevention of the formation of polymeric IDIDs and the removal thereof.

The disclosure of the publications cited herein is explicitly incorporated by reference.

The invention claimed is:

1. A method for improving a diesel fuel or a lubricant, the method comprising:
   adding at least one copolymer to the fuel or the lubricant, wherein:
   the copolymer comprises a statistical average of
      at least 4 carboxylic acid groups per polymer chain,
      a ratio of carbon atoms per carboxylic acid group of 7 to 35, and
      an acid number of 80 to 320 mg KOH/g, determined by potentiographic titration with 0.5 molar aqueous hydrochloric acid after heating in a 0.5 molar ethanolic potassium hydroxide solution for three hours;
   the copolymer does not include a nitrogen-containing functional group; and
   the adding results in the copolymer functioning as at least one selected from the group consisting of
      a fuel additive or lubricant for reducing fuel consumption, for minimizing power loss, or both, in a direct injection diesel engine, and
      a diesel fuel additive for reducing deposits, preventing deposits, or both in a fuel system.

2. The method according to claim 1, wherein the copolymer comprises up to 50 acid groups per polymer chain.

3. The method according to claim 1, wherein the copolymer comprises not more than 5 functional groups other than oxygen-containing functional groups per polymer chain.

4. The method according to claim 1, wherein the copolymer comprises not more than 3 oxygen-containing functional groups per polymer chain other than carbonate groups, ether groups or ester groups.

5. The method according to claim 1, wherein the copolymer comprises not more than 20 ether groups per polymer chain.

6. The method according to claim 1, wherein the copolymer comprises not more than 50 ester groups or carbonate groups per polymer chain.

7. The method according to claim 1, wherein the copolymer has a weight-average molecular weight Mw of 0.5 to 20 kDa (determined by gel permeation chromatography with tetrahydrofuran and polystyrene as standard) and a polydispersity of 1 to 10.

8. The method according to claim 1, wherein the copolymer functions as an additive for reducing the fuel consumption of a direct injection diesel engine comprising a common rail injection system.

9. The method according to claim 1, wherein the copolymer functions as an additive for minimizing power loss in a direct injection diesel engine comprising a common rail injection system.

10. The method according to claim 9, wherein the copolymer functions as an additive for minimizing power loss caused by at least one selected from the group consisting of K, Zn, Ca, and Na ions.

11. The method according to claim 1, wherein the copolymer functions as a diesel fuel additive for reducing deposits, preventing deposits, or both in a fuel system, wherein the fuel system is an injection system and the deposit is an internal diesel injector deposit, the deposit is a valve sticking and the fuel system is a direct injection diesel engine, or both.

12. The method according to claim 11, wherein the copolymer functions as a diesel fuel additive for reducing, preventing, or both the internal diesel injector deposit caused by at least one selected from the group consisting of Na, Ca, and K ions.

13. The method according to claim 11, wherein the copolymer functions as a diesel fuel additive for reducing, preventing, or both the internal diesel injector deposit caused by a polymeric deposit.

14. The method according to claim 1, wherein the copolymer has a solubility in toluene at 20° C. of at least 5 g/100 ml.

15. An additive concentrate composition, comprising:
at least one diesel fuel additive selected from the group consisting of a detergent additive, a carrier oil, a cold flow improver, a lubricity improver, a corrosion inhibitor, a demulsifier, a dehazer, an antifoam, a cetane number improver, a combustion improver, an antioxidant, a stabilizer, an antistat, a metallocene, a metal deactivator, a dye and solvent;
at least one copolymer comprising a statistical average of
at least 4 carboxylic acid groups per polymer chain,
a ratio of carbon atoms per carboxylic acid group of 7 to 35, and
an acid number of 80 to 320 mg KOH/g, determined by potentiographic titration with 0.5 molar aqueous hydrochloric acid after heating in a 0.5 molar ethanolic potassium hydroxide solution for three hours,
wherein:
the copolymer does not include a nitrogen-containing functional group; and
the additive concentrate composition is adapted to function as an additive concentrate composition for a diesel fuel.

16. The method according to claim 11, wherein the copolymer functions as a diesel fuel additive for reducing deposits, preventing deposits or both in a fuel system, wherein the deposit is a valve sticking and the fuel system is a direct injection diesel engine comprising a common rail injection system.

17. A diesel fuel or lubricant additive composition, comprising:
at least one copolymer comprising a statistical average of
at least 4 carboxylic acid groups per polymer chain,
a ratio of carbon atoms per carboxylic acid group of 7 to 35, and
an acid number of 80 to 320 mg KOH/g, determined by potentiographic titration with 0.5 molar aqueous hydrochloric acid after heating in a 0.5 molar ethanolic potassium hydroxide solution for three hours;
wherein the copolymer does not include a nitrogen-containing functional group.

18. A composition comprising diesel fuel and the diesel fuel or lubricant additive composition of claim 17.

19. A composition comprising gasoline and the diesel fuel or lubricant additive composition of claim 17.

* * * * *

UNITED STATES PATENT AND TRADEMARK OFFICE
CERTIFICATE OF CORRECTION

PATENT NO.       : 10,150,927 B2
APPLICATION NO.  : 15/115150
DATED            : December 11, 2018
INVENTOR(S)      : Jochen Mezger et al.

It is certified that error appears in the above-identified patent and that said Letters Patent is hereby corrected as shown below:

On the Title Page

Item (72), the Inventors' name:
"Jochen Mezger, Lautersheim (DE);
Maxim Peretolchin, Lambrecht (DE);
Aaron Flores-Figueroa, Mannheim (DE);
Markus Hansch, Speyer (DE);
Ludwig Voelkel, Limburgerhof (DE);
Ivette Garcia Castro, Ludwigshafen (DE);
Klaus Muehlbach, Gruenstadt (DE)"

Should read:
--Jochen Mezger, Lautersheim (DE);
Maxim Peretolchin, Lambrecht (DE);
Aaron Flores-Figueroa, Mannheim (DE);
Markus Hansch, Speyer (DE);
Ludwig Voelkel, Limburgerhof (DE);
Ivette Garcia Castro, Ludwigshafen (DE);
Klaus Muehlbach, Gruenstadt (DE);
Harald Boehnke, Hemsbach (DE)--

Signed and Sealed this
Fifth Day of May, 2020

Andrei Iancu
*Director of the United States Patent and Trademark Office*